(12) United States Patent
Do Rosario et al.

(10) Patent No.: US 12,269,239 B1
(45) Date of Patent: Apr. 8, 2025

(54) ILLUMINABLE GLAZING

(71) Applicant: SAINT-GOBAIN GLASS FRANCE, Courbevoie (FR)

(72) Inventors: Jefferson Do Rosario, Herzogenrath (DE); Achim Zeichner, Herzogenrath (DE); Matthias Mandelartz, Herzogenrath (DE); Pierre Sarkissian, Herzogenrath (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 18/729,363

(22) PCT Filed: Jan. 25, 2023

(86) PCT No.: PCT/EP2023/051742
§ 371 (c)(1),
(2) Date: Jul. 16, 2024

(87) PCT Pub. No.: WO2023/144172
PCT Pub. Date: Aug. 3, 2023

(30) Foreign Application Priority Data

Jan. 28, 2022 (EP) .................... 22153882

(51) Int. Cl.
*B32B 17/10* (2006.01)
*F21V 8/00* (2006.01)

(52) U.S. Cl.
CPC .. *B32B 17/10348* (2013.01); *B32B 17/10036* (2013.01); *B32B 17/10266* (2013.01); *B32B 17/1044* (2013.01); *B32B 17/1066* (2013.01); *B32B 17/10761* (2013.01); *G02B 6/0095* (2013.01); *B32B 2307/402* (2013.01); *B32B 2307/7375* (2023.05)

(58) Field of Classification Search
CPC ....... B23B 17/10005–10798; B23B 2307/402; B23B 2307/7375; G02B 6/0095
See application file for complete search history.

(56) References Cited

U.S. PATENT DOCUMENTS

| 10,639,869 B2 * | 5/2020 | Bauerle ................. B60Q 1/268 |
| 2014/0240997 A1 | 8/2014 | Massault et al. |
| 2014/0254187 A1 | 9/2014 | Massault et al. |

FOREIGN PATENT DOCUMENTS

| WO | WO 2007/077099 A1 | 7/2007 |
| WO | WO 2010/049638 A1 | 5/2010 |
| WO | WO 2013/053629 A1 | 4/2013 |
| WO | WO 2013/110885 A1 | 8/2013 |

(Continued)

OTHER PUBLICATIONS

International Search Report as issued in International Patent Application No. PCT/EP2023/051742, dated Apr. 14, 2023.

*Primary Examiner* — Jason M Han
(74) *Attorney, Agent, or Firm* — Pillsbury Winthrop Shaw Pitman LLP

(57) ABSTRACT

A glazing assembly includes a light source for generating light which can be coupled into a first pane, an edge region which extends from a pane edge of the first pane over at least 1 mm up to at most 500 mm on one of the surfaces, and to an absorption device for absorbing light which is coupled into the first pane and is arranged in the edge region, wherein the absorption device includes a light-impermeable thermoplastic intermediate layer.

20 Claims, 3 Drawing Sheets

(56) References Cited

FOREIGN PATENT DOCUMENTS

Figure 1:
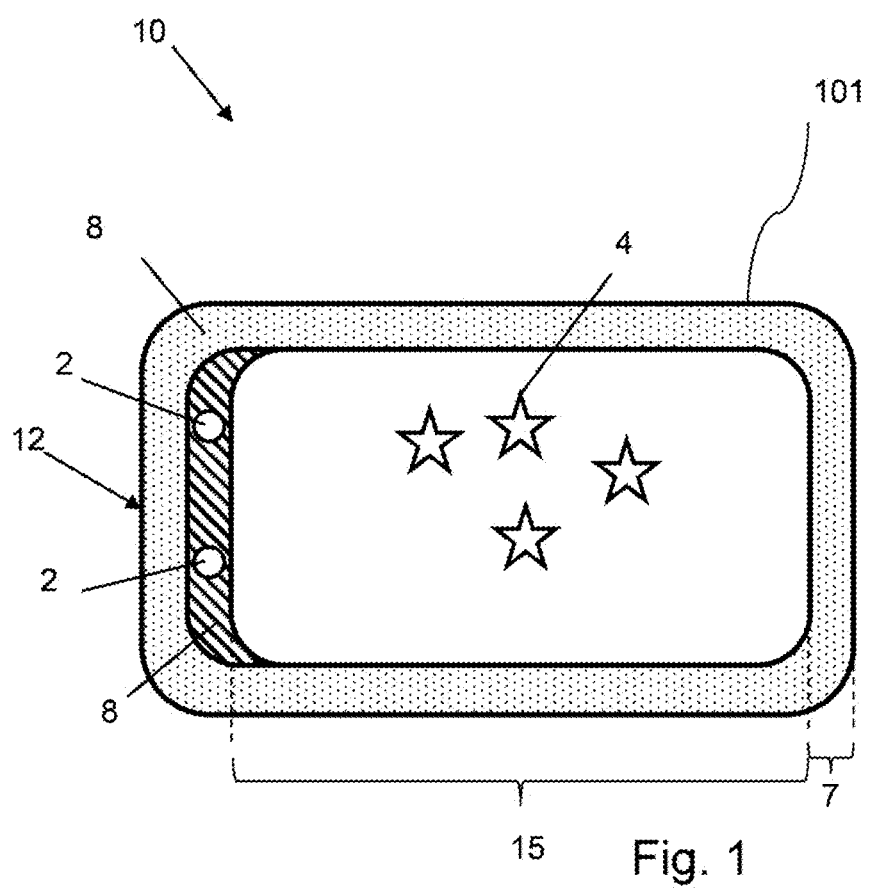

| WO | WO 2014/060409 A1 | 4/2014 |
| WO | WO 2014/167291 A1 | 10/2014 |
| WO | WO 2015/095288 A2 | 6/2015 |
| WO | WO 2018/178591 A1 | 10/2018 |
| WO | WO 2019/105855 A1 | 6/2019 |

* cited by examiner

ILLUMINABLE GLAZING

CROSS-REFERENCE TO RELATED APPLICATIONS

This application is the U.S. National Stage of PCT/EP2023/051742, filed Jan. 25, 2023, which in turn claims priority to European patent application number 22153882.0 filed Jan. 28, 2022. The content of these applications are incorporated herein by reference in their entirety.

The invention relates to a glazing assembly with a light source and a light outcoupling means.

Motor vehicles in their interior have a light distribution which, depending on requirements, ensures a discrete or conspicuous illumination of the interior. The lighting not only provides orientation in the vehicle, but also creates a pleasant atmosphere for occupants. Laminated panes as glazings made of two or more glass or polymeric panes are used in vehicles as windshields, rear panes, side panes, and roof panes. In the case of illuminable or illuminated glazings, light from a light source is coupled into a planar light guide in the form of a pane of the glazing, using total reflection.

WO 2010/049638 A1, WO 2013/053629 A1, WO 2014060409 A1 or WO 2015/095288 A2 disclose the coupling of light into a glass pane via a side surface. If the light source is placed very close to the glass edge, light can be thereby coupled into the light guide very efficiently and over the entire width of the light guide. A very homogeneous planar illumination can thereby be achieved. From WO2013/110885 A1, WO2018178591 A1 or WO2019/105855 A1, it is known to arrange the light source in a recess and thereby couple the light into the pane.

By multiple reflections at the parallel surfaces of the pane, the light reflections reach the edge region of the pane where they can exit from the pane again. This produces an illuminated edge region. This undesired light effect in the edge region of the pane can be easily perceived by an observer.

The object of the present invention is to provide an improved glazing assembly in which light coupled into the pane cannot be perceived as scattered light in the edge region of the pane.

This object is achieved by a glazing assembly according to claim 1. Preferred embodiments are apparent from the dependent claims.

The glazing assembly according to the invention comprises a first pane with a first surface (IV) and a second surface (III). The first pane is provided to at least partially transmit coupled in light. Furthermore, the glazing assembly comprises a light source for generating light that can be coupled into the first pane, and a light outcoupling means for coupling light out of the first pane via one of the two surfaces (III, IV). Furthermore, the first pane is joined to a second pane via an intermediate layer to form a laminated pane. The glazing assembly has an edge region which extends from a pane edge of the first pane over at least 1 mm up to 500 mm on one of the surfaces (III, IV), and an absorption means for absorbing light coupled into the first pane which is arranged in the edge region, wherein the absorption means comprises a light-impermeable, in particular opaque, thermoplastic intermediate layer.

Because light outcoupling at the edges of the laminated pane is not desired, the edge region of the first pane has the light-impermeable thermoplastic intermediate layer which absorbs the scattered light. This greatly reduces the scattered light in the edge region of the laminated pane with minimal effort. The light-impermeable thermoplastic intermediate layer is preferably dark, black or gray. The black coloration particularly effectively prevents the scattered light from exiting the laminated panes in the edge region. However, the light-impermeable thermoplastic intermediate layer can also have any other color.

In a particularly preferred embodiment, the intermediate layer comprises a transparent thermoplastic intermediate layer and the light-impermeable thermoplastic intermediate layer. An object, in particular a pane, layer or film, which has a transmittance in the visible spectral range of less than 5%, preferably less than 2%, particularly preferably 0%, is understood as "light-impermeable" within the meaning of the invention.

The transparent thermoplastic intermediate layer can be formed by a first thermoplastic laminated film and the light-impermeable thermoplastic intermediate layer by a second thermoplastic film, wherein the first thermoplastic laminated film is transparent, and the second thermoplastic film is opaque. The light-impermeable thermoplastic intermediate layer can be designed as an opaque thermoplastic, in particular polymeric film. The term "opaque" denotes a lack of transparency. For the purposes of the invention, opaque means that an observer cannot look through the intermediate layer or cover layer.

The transparent thermoplastic intermediate layer and the light-impermeable thermoplastic intermediate layer preferably contain or consist of at least one plastics material, preferably polyvinyl butyral (PVB), ethylene vinyl acetate (EVA) and/or polyethylene terephthalate (PET).

The intermediate layer can however also contain, for example, polyurethane (PU), polypropylene (PP), polyacrylate, polyethylene (PE), polycarbonate (PC), polymethyl methacrylate, polyvinyl chloride, polyacetate resin, casting resins, acrylates, fluorinated ethylene propylene, polyvinyl fluoride, and/or ethylene tetrafluoroethylene, or copolymers or mixtures thereof. The intermediate layer can be formed by one or even by a plurality of films arranged one over another, wherein the thickness of a film is preferably from 0.025 mm to 1 mm, typically 0.38 mm or 0.76 mm. The intermediate layers can preferably be thermoplastic, and, after lamination, the first pane, the second pane, and any other intermediate layers can be bonded to one another. Particularly advantageous are so-called acoustic-damping intermediate layers which preferably consist of three layers of PVB, wherein the middle layer is designed to be softer than the two outer layers.

The intermediate layer can also have a functional layer, in particular a layer reflecting infrared radiation, a layer absorbing infrared radiation, a layer absorbing UV radiation, an at least sectionally colored layer, and/or an at least sectionally tinted layer. For example, the thermoplastic intermediate layer can also be a bandpass filter.

The light-impermeable thermoplastic intermediate layer and the transparent thermoplastic intermediate layer preferably consist of polyvinyl butyral. This achieves the best results and prevents material incompatibilities. The transparent thermoplastic intermediate layer and the light-impermeable thermoplastic intermediate layer form the intermediate layer. A continuous intermediate layer is thus obtained, which is advantageous for a uniform pane geometry. The first laminated film can extend over the entire surface of the laminated pane with the exception of the edge region. The opaque film extends at least, preferably exclusively, over the edge region of the laminated pane. Furthermore, the light-impermeable thermoplastic intermediate layer can extend from the pane edge to a recess in which the light source is arranged. The light-impermeable thermoplastic intermediate layer can extend from the pane edge toward the pane center of the laminated pane over 1 mm up to 500 mm, preferably 10 mm to 150 mm, particularly preferably 10 mm to 15 mm.

In one embodiment, the absorption means additionally comprises a first cover layer which is arranged on the first surface (IV) of the first pane.

In a further embodiment, the second pane has a second cover layer. The first cover layer and/or the second cover layer are preferably opaque. Furthermore preferably, the light-impermeable thermoplastic intermediate layer and the first and second cover layer have the same optical density.

In a particularly preferred embodiment, the second pane has the second cover layer. The scattered light is thereby absorbed in the edge region on both main surfaces of the laminated pane. The first cover layer and the second cover layer can extend from the pane edge of the first pane over 1 mm up to 500 mm, preferably 10 mm to 150 mm, particularly preferably 10 mm to 15 mm.

In one embodiment, the light-continuous thermoplastic intermediate layer, the first cover layer and the second cover layer overlap at least partially in the viewing direction through the laminated pane.

It is preferably provided that the first cover layer is arranged on the first surface of the first pane. In particular, the first cover layer and the second cover layer overlap at least partially in the viewing direction through the laminated pane.

The cover layers are also referred to as a cover print or black print. The covering print is formed from a printing ink. The first cover layer and/or the second cover layer can be formed from an opaque enamel, preferably applied as a screen print or as a digital print. The enamel can contain glass frits and/or mineral frits and optionally at least one pigment, preferably containing glass frits and/or mineral frits based on oxides selected from boron, bismuth, zinc, silicon, aluminum and sodium. The pigment provides the opacity of the cover layer. The pigment can have a black pigment, such as pigment carbon black, aniline black, bone black, iron oxide black, spinel black and/or graphite. Alternatively, the first and/or second cover layer can be designed as an in particular black adhesive tape or a base layer, a so-called primer. The primer can comprise a sol-gel layer of silicon oxide in a mixture with other inorganic oxides.

Alternatively or additionally, the absorption means can comprise a further cover layer which is arranged on the intermediate layer, in particular on the light-impermeable thermoplastic intermediate layer.

In a further embodiment, the laminated pane comprises a peripheral pane edge, wherein the absorption means is arranged at least sectionally along the peripheral pane edge, or the absorption means extends peripherally along the entire peripheral pane edge. The laminated pane has a see-through region in which the laminated pane does not have a cover layer. The see-through region of the laminated pane comprises at least 30%, preferably 50% of the area of the laminated pane. If the laminated pane is designed as a roof pane or windshield, the see-through region can comprise at least 70% or at least 80% of the area of the laminated pane.

In a further embodiment, the light source comprises at least one or more light-emitting diodes (LED). This type of light source is particularly bright and effective. The first pane has at least one recess for accommodating the light source. A reduction of the light scattered into the surroundings outside the laminated pane and improved light coupling into the first pane can thereby be achieved. Alternatively, the light source can be arranged outside of the laminated pane on a side surface or on the first surfaces (IV) of the first pane so that light is coupled into the first pane via an outer side surface or the first surface (IV).

In principle, all electrically insulating substrates that are thermally and chemically stable as well as dimensionally stable under the conditions of production and use of the laminated pane are suitable as the first pane and the second pane.

The first pane and the second pane preferably contain glass, particularly preferably float glass made of clear glass, very particularly preferably diamond glass. Alternatively, the panes can also contain flat glass, such as soda lime glass, borosilicate glass or quartz glass, or clear plastics, rigid clear plastics, in particular polyethylene, polypropylene, polycarbonate, polymethyl methacrylate, polystyrene, polyamide, polyester, polyvinyl chloride, and/or mixtures thereof. The first pane and/or the second pane are preferably transparent, in particular for the use of the panes as a roof pane, windshield or rear window of a vehicle, or other uses where high light transmittance is desired. In particular, at least the first pane and preferably also the second pane consists of clear glass.

A coating, in particular a pane or an object, is understood to be transparent if the coating, the pane or the object has a transmittance in the visible spectral range of greater than 20%, preferably 50%, particularly preferably greater than 70%, in particular greater than 85%.

However, for panes that are not situated in the traffic-relevant field of vision of the driver, for example for roof panes, transmittance can also be much lower, for example, greater than 5%. Within the meaning of the invention, transparent means that an observer can look through the pane or intermediate layer and can recognize objects that are located behind the pane or intermediate layer as seen by the observer. For this purpose, for example, the second pane and/or the intermediate layer can be tinted or colored.

The thickness of the first pane and/or the second pane can vary widely and thus be ideally adapted to the requirements of the individual case. Preferably, standard thicknesses of 1.0 mm to 25 mm, preferably of 1.4 mm to 2.5 mm, are used for vehicle glass, and preferably of 4 mm to 25 mm are used for furniture, equipment and buildings. The size of the panes can vary widely and depends upon the size of the use according to the invention. The first and the second panes have surfaces from 200 cm$^2$ up to 20 m$^2$, as is usual, for example, in vehicle construction and the architectural sector.

The laminated pane can have any three-dimensional shape. Preferably, the three-dimensional shape has no shadow zones so that they can be coated with further coatings, for example, by cathodic sputtering. Preferably, the panes are planar or slightly or markedly curved in one or more spatial directions. In particular, planar substrates are used. The panes can be colorless or tinted.

The terms "first pane" and "second pane" have been chosen in order to differentiate the two panes of a laminated pane according to the invention. No statement about geometric arrangement is associated with the terms. When the laminated pane according to the invention is, for example, provided in an opening in, for example, a vehicle or a building, in order to separate the interior from the external environment, the first pane can face the interior or the external environment.

In an advantageous embodiment, the laminated pane is a roof pane of a motor vehicle, wherein the first pane is the inner pane, and the second pane is the outer pane.

Furthermore, the first pane and/or the second pane can have further suitable coatings, for example an anti-reflection coating, an anti-adhesion coating, an anti-scratch coating, a photocatalytic coating, a sun protection coating, and/or low-E coating.

Furthermore, the glazing assembly can optionally comprise further functional elements, in particular electronically controllable optical elements, for example PDLC elements, electrochromic elements or the like which are typically arranged between the first pane and the second pane.

The first pane and the second pane are laminated together via the intermediate layer, for example by autoclave processes, vacuum bag processes, vacuum ring processes, calendering processes, vacuum laminators, or combinations thereof. The pane is usually joined under the effect of heat, vacuum and/or pressure.

In a further aspect, the present invention comprises a vehicle, in particular a passenger car, having a glazing assembly according to the invention.

In a further aspect, the present invention comprises a method for producing the glazing assembly according to the invention, at least comprising:
   providing a first pane, a second pane and a thermoplastic intermediate layer which comprises a light-impermeable thermoplastic intermediate layer as an absorption means,
   arranging the absorption means in an edge region,
   arranging at least one light source on the first pane,
   arranging a light outcoupling means on a first surface (IV) of the first pane,
   joining the first pane and the second pane via the thermoplastic intermediate layer by lamination so that the second surface (III) of the first pane faces the thermoplastic intermediate layer.

The light-impermeable thermoplastic intermediate layer is preferably formed by an opaque thermoplastic film, wherein the thermoplastic intermediate layer contains the light-impermeable thermoplastic intermediate layer and a transparent thermoplastic intermediate layer.

The light-impermeable thermoplastic intermediate layer can be arranged manually or mechanically, for example by means of a robot. The light-impermeable thermoplastic intermediate layer, in particular opaque thermoplastic film, can be held in position by the laminated-in transparent thermoplastic intermediate layer.

If the laminated pane should have a bend, as is customary in particular for passenger cars, the panes are subjected to a bending process before lamination. Preferably, before lamination and before optional bending, an opaque cover layer is applied in particular to the edge region of the second pane. The cover layer is applied during the production of the laminated pane arrangement in screen printing before bending the individual panes. For this purpose, a black or dark enamel is applied by screen printing and burned in before lamination, in particular before bending or during bending.

The present invention furthermore comprises the use of the glazing assembly according to the invention in means of transport for traffic on land, in the air or on water, in particular in motor vehicles, for example as a roof pane, rear pane and or side pane.

Within the scope of the present invention, all embodiments mentioned with regard to individual features can also be freely combined with one another, as long as they are not contradictory.

In the following, the invention is explained in more detail with reference to figures and exemplary embodiments. The figures are schematic representations and not to scale. The figures do not limit the invention in any way.

Figure 2:
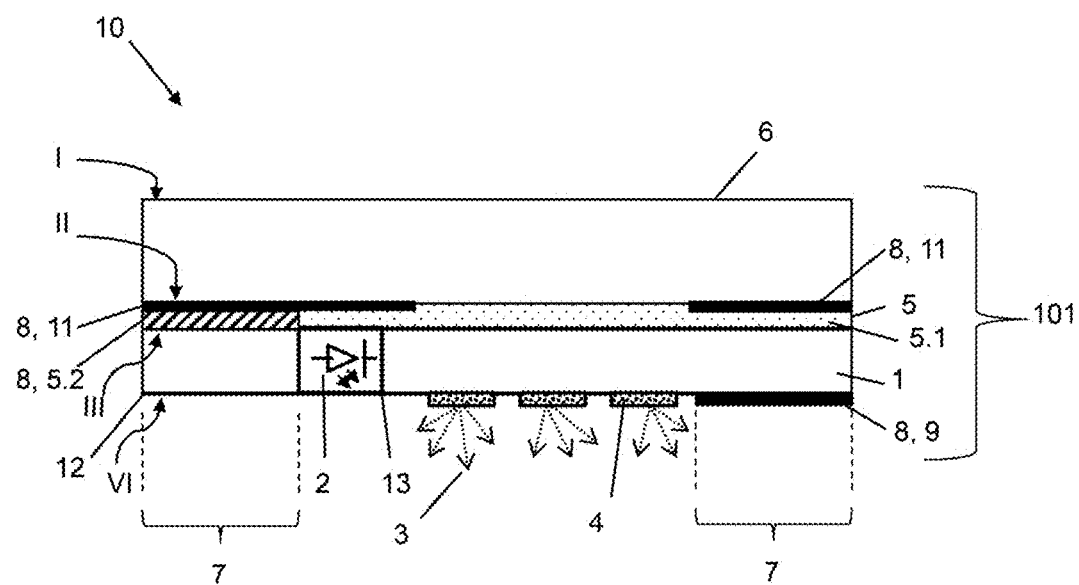
Figure 3:
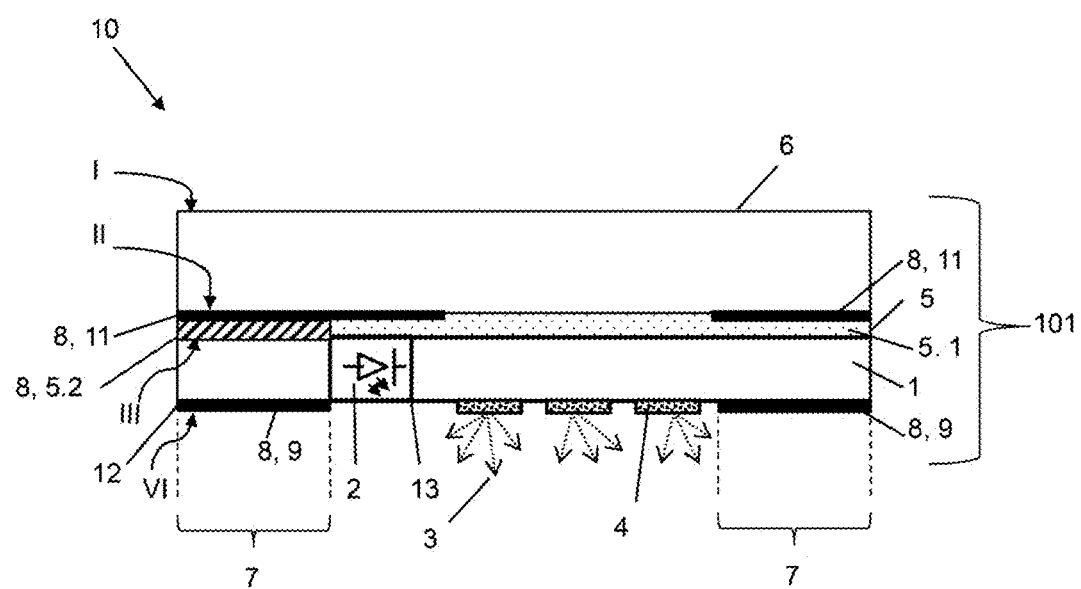

In the figures:
   FIG. 1 shows a plan view of an embodiment of a laminated pane according to the invention with the example of a roof pane of a vehicle,
   FIG. 2 shows a schematic cross-sectional view of a first embodiment of the glazing assembly according to the invention, and
   FIG. 3 shows a schematic cross-sectional view of a second embodiment of the glazing assembly according to the invention.

Data with numerical values are generally not to be understood as exact values, but also include a tolerance of +/−1% up to +/−10%.

FIG. 1 shows a plan view of an embodiment of a glazing assembly 10 according to the invention with a laminated pane 101 in the example of a roof pane for a vehicle. Alternatively, the laminated pane 101 can be a construction glazing or components of a piece of furniture or electrical device. The glazing assembly 10 can also be part of an insulating glazing unit and can serve, for example, as an outer pane or inner pane in a window of a building. Furthermore, the glazing assembly 10 can be installed in an interior and can serve, for example, as glazing of a conference room.

The glazing assembly 10 comprises the laminated pane 101 and two light sources 2. The light sources 2 are provided to emit light in the visible region. Alternatively, they can emit infrared or ultraviolet light. Each light source 2 of the glazing assembly 10 can be one or more light-emitting diodes (LED, LED module, LED luminaire). A light source 2 can also comprise an organic light-emitting diode (OLED).

The laminated pane 101 furthermore has four light outcoupling means 4. A light outcoupling means 4 couples light out of the laminated pane 101. The light outcoupling means 4 are arranged on the first surface IV (main surface of the laminated pane 101). At the location at which a light outcoupling means 4 is arranged, the light can exit from the laminated pane 101 via the surface IV.

The light outcoupling means 4 can be arranged at any desired location of the surface IV. In FIG. 1, the light outcoupling means 4 comprises structurings of the surface IV at which the total reflection within the laminated pane 101 is prevented, and light can exit from the laminated pane 101 via the surface IV. Alternatively, the light outcoupling means 4 can comprise an imprint on the surface IV or light-scattering, light-refracting, light-diffracting or light-reflecting particles or cavities introduced into the laminated pane 101.

In the present embodiment, the light outcoupling means 4 in this case is also designed as an imprint of fine light-scattering particles on the surface IV. The total reflection of a light beam at the interface between the laminated pane 101 and surrounding air is interrupted by this, and the light is coupled out of the laminated pane 101 by scattering.

The laminated pane 101 has an absorption means 8 in the edge region 7 for absorbing light 3 coupled into the laminated pane 101. The laminated pane 101 comprises a peripheral pane edge 12, wherein the absorption means 8 extends peripherally along the entire peripheral pane edge 12. Alternatively, the absorption means 8 can be arranged at least sectionally along the peripheral pane edge 12. The width of the edge region 7 is measured from the pane edge 12 and is, for example, 10 mm, 50 mm or 100 mm.

Surprisingly, it has been found that an arrangement of absorption means 8 in the edge region 7 of the laminated pane 101 particularly effectively prevents scattered light at the pane edge 12. This is particularly advantageous for panes whose edge regions are not covered in the installed state. Thanks to the absorption means 8, the free edges are darkened, and thus the luminous patterns (for example stars) formed by the light outcoupling center 4 can be clearly seen.

The laminated pane 101 has a see-through region 15 in which the laminated pane does not have a cover layer. The see-through region 15 of the laminated pane 101 comprises, for example, at least 70% of the area of the laminated pane 101.

FIG. 2 shows an enlarged cross-sectional view of the glazing assembly 10 according to the invention from FIG. 1. The laminated pane 101 comprises a first pane 1 which is joined to a second pane 6 via an intermediate layer 5. The first pane 1, the intermediate layer 5 and the second pane 6 were joined to one another by lamination, in particular autoclaving. The second pane 6 has a first surface I and a second surface II opposite the first surface I.

The first pane 1 has a first surface IV and a second surface III opposite the first surface IV. The end faces of the laminated pane 101 are arranged orthogonally to the surfaces III, IV. The first pane 1 and the second pane 6 are made, for example, of soda lime glass. The thermoplastic intermediate layer 5 is formed, for example, from a 0.76 mm thick PVB film. The thickness of the first pane 1 is, for example, 1.6 mm, and the thickness of the second pane 6 can be, for example, 2.1 mm. The first pane 1 and the second pane 6 can have any desired thicknesses; for example, they can also be equally thick. The laminated pane 101 is delimited by four peripheral side surfaces.

The first pane 1 can have prestressed, partially prestressed or non-prestressed glass. Alternatively, the first pane 1 can consist of a plastic, for example polycarbonate. The first pane 1, the second pane 6 and the intermediate layer 5 are, for example, clear (neither tinted nor colored). Alternatively or additionally, the second pane 6 can be tinted dark.

The first pane 1 has a recess 13 into which one of the two light sources 2 is inserted. The recess 13 extends continuously from the first surface IV of the first pane 1 up to the second surface III of the first pane 1. The intermediate layer 5 was not removed in the region of the recess 13. The light source 2 is located completely within the laminated pane 101. The light 3 emitted by the light source 2 is directed toward the pane 1. The pane 1 is provided for transmitting the coupled-in light 3 in the longitudinal direction. The first pane 1 preferably represents an inner pane, and the second pane 6 represents an outer pane. In the installed position, the inner pane faces an interior. In the installed position, the outer pane faces the external surroundings (e.g., of a vehicle). Due to the position of the light sources 2 in the first pane 1, this arrangement is particularly advantageous, because the outcoupling of the light takes place in the direction of the (vehicle) interior, which leads to a pleasant atmosphere in the interior. Alternatively, the second pane 6 can also represent the inner pane, and the first pane 1 can represent the outer pane.

The intermediate layer 5 comprises a transparent thermoplastic intermediate layer 5.1 and a light-impermeable thermoplastic intermediate layer 5.2. The transparent thermoplastic intermediate layer 5.1 is designed as a first thermoplastic laminated film, and the light-impermeable thermoplastic intermediate layer 5.2 is designed as a second thermoplastic film. The first thermoplastic laminated film is transparent, and the second thermoplastic film is opaque.

The light-impermeable thermoplastic intermediate layer 5.2 extends approximately 10 mm, 50 mm or 100 mm from the pane edge 12 in the direction of the pane center of the laminated pane 101. The light-impermeable thermoplastic intermediate layer 5.2 is arranged along the pane edge 12.

In the embodiment shown in FIG. 2, the absorption means 8 comprises the light-impermeable intermediate layer 5.2 as well as a first cover layer 9 and a second cover layer 11. The first cover layer 9 is arranged on the first surface IV of the first pane 1. The second cover layer 11 is applied to the surface II of the second pane 6. Because a light outcoupling at the edges of the laminated pane is not desired, the edge region 7 of the first pane 1 has the light-impermeable intermediate layer 5.2, the first cover layer 9, and the second cover layer 11 which absorb the scattered light. The scattered light in the edge region 7 of the laminated pane 101 is thereby prevented with little effort.

The second cover layer 11 is arranged on the second surface II of the second pane 6. In particular, the light-impermeable thermoplastic intermediate layer 5.2 and the second cover layer 11 overlap in the viewing direction through the laminated pane 101. The light source 2 is covered by the second cover layer 11 in the viewing direction. The second cover layer 11 is a peripheral, i.e., frame-like cover print. The second cover layer 11 frames the see-through region 15. The first cover layer 9 and the second cover layer 11 are designed to be opaque and cover the entire surface.

The first cover layer 9 and the second cover layer 11 contain pigments and glass frits. They can contain further chemical compounds. The glass frits can be melted or fused on, and the cover layer 9 and 11 can thus be permanently joined (fused or sintered) to the glass surface. The pigment ensures the opacity of the cover layer 9, 11. Such cover layers are applied as enamel.

FIG. 3 shows a schematic cross-sectional view of a second embodiment of the glazing assembly 10 according to the invention. The glazing assembly 10 shown in FIG. 3 is particularly well-suited as a roof pane of a motor vehicle. The glazing assembly 10 from FIG. 3 has a structure similar to the glazing assembly 10 of FIG. 2. The second pane 6 (outer pane) resembles the pane 6 from FIG. 2. In contrast to FIG. 2, however, the first cover layer 9 in FIG. 3 is applied in a frame-like manner on the first surface IV of the first pane 1.

The first pane 1 is provided, for example, to be facing an interior of a vehicle in the installation position. Therefore, the first surface IV of the first pane 1 is accessible from the interior, whereas in contrast the first surface I of the second pane 6 faces outward relative to the vehicle interior.

LIST OF REFERENCE SIGNS

1 First pane
2 Light source
3 Light
4 Light outcoupling means
5 Intermediate layer
5.1 Transparent thermoplastic intermediate layer
5.2 Opaque thermoplastic intermediate layer
6 Second pane
7 Edge region
8 Absorption means
9 First cover layer
10 Glazing assembly
11 Second cover layer
12 Pane edge
13 Recess
15 See-through region
101 Laminated pane I First surface of the second pane 6
II Second surface of the second pane 6
III Second surface of the first pane 1
IV First surface of the first pane 1

The invention claimed is:

1. A glazing assembly comprising:
 a first pane having a first surface and a second surface, wherein the first pane is provided to at least partially transmit coupled-in light,
 a light source for generating light that can be coupled into the first pane,
 a light outcoupling means for outcoupling light from the first pane via one of the first and second surfaces,
 wherein the first pane is joined to a second pane via an intermediate layer to form a laminated pane,
 an edge region which extends from a pane edge of the first pane over at least 1 mm up to at most 500 mm on one of the first and second surfaces, and
 an absorption means for absorbing light coupled into the first pane and arranged in the edge region,
 wherein the absorption means comprises a light-impermeable thermoplastic intermediate layer.

2. The glazing assembly according to claim 1, wherein the light-impermeable thermoplastic intermediate layer is colored black.

3. The glazing assembly according to claim 1, wherein the intermediate layer comprises a transparent thermoplastic intermediate layer and the light-impermeable thermoplastic intermediate layer.

4. The glazing assembly according to claim 3, wherein the transparent thermoplastic intermediate layer is formed by a first thermoplastic laminated film, and the light-impermeable thermoplastic intermediate layer is formed by a second thermoplastic laminated film, wherein the first thermoplastic laminated film is transparent, and the second thermoplastic laminated film is opaque.

5. The glazing assembly according to claim 4, wherein the first thermoplastic laminated film extends over the entire surface of the laminated pane with the exception of the edge region, and the second thermoplastic laminated film extends at least; over the edge region of the laminated pane.

6. The glazing assembly according to claim 4, wherein the opaque thermoplastic intermediate layer extends from the pane edge to a recess in which the light source is arranged.

7. The glazing assembly according to claim 1, wherein the light-impermeable thermoplastic intermediate layer and the light source do not overlap in the viewing direction through the laminated pane.

8. The glazing assembly according to claim 1, wherein the absorption means comprises a first cover layer which is arranged on the first surface of the first pane.

9. The glazing assembly according to claim 8, wherein the second pane has a second cover layer.

10. The glazing assembly according to claim 9, wherein the first cover layer and/or the second cover layer are/is opaque.

11. The glazing assembly according to claim 8, wherein the first cover layer extends from a pane edge of the first pane over 1 mm up to 500 mm.

12. The glazing assembly according to claim 1, wherein the absorption means is arranged at least sectionally along a peripheral pane edge of the laminated pane, or the absorption means extends peripherally along the entire peripheral pane edge.

13. The glazing assembly according to claim 9, wherein the first cover layer and/or the second cover layer is an opaque enamel.

14. The glazing assembly according to claim 9, wherein the light-impermeable thermoplastic intermediate layer overlaps the first cover layer and the second cover layer at least partially in the viewing direction through the laminated pane.

15. The glazing assembly according to claim 1, wherein the laminated pane is a roof pane of a motor vehicle, and the first pane is the inner pane, and the second pane is the outer pane.

16. A vehicle comprising the glazing assembly according to claim 1.

17. The glazing assembly according to claim 5, wherein the second thermoplastic laminated film extends exclusively over the edge region of the laminated pane.

18. The glazing assembly according to claim 11, wherein the first cover layer extends from a pane edge of the first pane over 10 mm up to 150 mm.

19. The glazing assembly according to claim 18, wherein the first cover layer extends from a pane edge of the first pane over 10 mm to 15 mm.

20. The glazing assembly according to claim 13, wherein the opaque enamel is applied as a screen print or as a digital print.

* * * * *